(12) United States Patent
Cui et al.

(10) Patent No.: US 10,028,083 B2
(45) Date of Patent: Jul. 17, 2018

(54) MOBILITY MANAGEMENT

(71) Applicant: AT&T Intellectual Property I, LP, Atlanta, GA (US)

(72) Inventors: Zhi Cui, Sugar Hill, GA (US); James W. Rembert, Atlanta, GA (US); Thomas A. Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 327 days.

(21) Appl. No.: 14/533,852

(22) Filed: Nov. 5, 2014

(65) Prior Publication Data

US 2016/0127889 A1 May 5, 2016

(51) Int. Cl.
*H04W 4/02* (2018.01)
*H04W 76/02* (2009.01)
*H04W 76/14* (2018.01)
*H04W 36/08* (2009.01)
*H04L 12/26* (2006.01)
*H04W 48/20* (2009.01)

(52) U.S. Cl.
CPC ............. *H04W 4/02* (2013.01); *H04W 36/08* (2013.01); *H04W 76/023* (2013.01); *H04W 76/14* (2018.02); *H04L 43/08* (2013.01); *H04W 48/20* (2013.01)

(58) Field of Classification Search
None
See application file for complete search history.

(56) References Cited

U.S. PATENT DOCUMENTS

| 5,913,160 | A | 6/1999 | Leung | |
|---|---|---|---|---|
| 5,937,343 | A | 8/1999 | Leung | |
| 2005/0208938 | A1* | 9/2005 | Pecen | H04W 48/18 455/428 |
| 2007/0099649 | A1* | 5/2007 | Han | H04L 29/12028 455/525 |
| 2009/0248841 | A1* | 10/2009 | Tjandra | H04L 29/12216 709/220 |
| 2011/0028154 | A1* | 2/2011 | Klatt | H04W 68/08 455/450 |

(Continued)

FOREIGN PATENT DOCUMENTS

| EP | 2988542 A1 * | 2/2016 | ............ H04W 24/02 |
|---|---|---|---|
| WO | WO 2013/184225 A1 | 12/2013 | |

OTHER PUBLICATIONS

Hampel, et al., "Applying Software-Defined Networking to the Telecom Domain." Computer Communications Workshops, IEEE, 2013, 6 pages.

(Continued)

*Primary Examiner* — Jeffrey M Rutkowski
*Assistant Examiner* — Andre Tacdiran
(74) *Attorney, Agent, or Firm* — Baker & Hostetler LLP

(57) ABSTRACT

Mobility management may be utilized to effectuate handover and route packets of information to one or more radio access technologies and/or cells/access points based on network, UE conditions, device location, and/or network entity location. Packet routes, device addresses, handover functions, dynamically may be adjusted based on the best radio technology, cell layer, service provider specified criteria, or the like.

18 Claims, 17 Drawing Sheets

(56) References Cited

U.S. PATENT DOCUMENTS

| | | | |
|---|---|---|---|
| 2011/0103284 A1* | 5/2011 | Gundavelli | H04L 12/18 370/312 |
| 2012/0002638 A1* | 1/2012 | Huh | H04W 36/14 370/331 |
| 2012/0195255 A1* | 8/2012 | Nylander | H04W 60/04 370/328 |
| 2012/0195294 A1* | 8/2012 | Shah | H04L 41/0806 370/338 |
| 2012/0196588 A1* | 8/2012 | Shah | H04W 8/22 455/419 |
| 2013/0028163 A1* | 1/2013 | Hsiao | H04W 4/06 370/312 |
| 2014/0020102 A1 | 1/2014 | Srinivasan et al. | |
| 2014/0078988 A1 | 3/2014 | Kant et al. | |
| 2014/0153572 A1 | 6/2014 | Hampel et al. | |
| 2014/0204746 A1 | 7/2014 | Sun et al. | |
| 2014/0226467 A1 | 8/2014 | Park | |
| 2015/0230151 A1* | 8/2015 | Muhanna | H04W 8/04 370/329 |
| 2016/0066310 A1* | 3/2016 | Hashimoto | H04W 88/10 370/329 |
| 2016/0073389 A1* | 3/2016 | Kishiyama | H04L 5/005 370/329 |
| 2016/0183315 A1* | 6/2016 | Worrall | H04W 8/26 370/329 |
| 2016/0286544 A1* | 9/2016 | Ikeda | H04W 72/048 |
| 2016/0352637 A1* | 12/2016 | Wakumoto | H04L 45/745 |

OTHER PUBLICATIONS

Li, et al., "Toward Software-Defined Cellular Networks." Software Defined Networking (EWSDN), 2012 European Workshop on. IEEE, 2012, 6 pages.

Pentikousis, et al., "Mobileflow: Toward software-defined mobile networks." Communications Magazine, IEEE 51.7, Jul. 2013, pp. 44-53.

* cited by examiner

MOBILITY MANAGEMENT

TECHNICAL FIELD

The technical field generally relates to communications, and more specifically to managing communications devices and network entities in a simplified telecommunications network.

BACKGROUND

The amount of traffic processed by telecommunications networks is increasing rapidly. Further, the variation of different types of end points, the variation of applications, and the variation of mobility state (e.g., moving, stationary, speed, direction, velocity, etc.) of user equipment (UE) is increasing. And the trend is continuing. To keep up with this trend, various radio technologies (e.g., Wi-Fi, 2G, 3G, 4G, LTE, etc.) have been developed. Each radio technology may have its own management and control mechanisms that may not be fully compatible with other radio technologies. Thus, interfaces between radio technologies may be complex and cumbersome (e.g., interfaces using tunneling protocols such as Layer 2 Tunneling Protocol—L2TP, User Datagram Protocol—UDP, General Packet Radio Service, GPRS, Tunneling Protocol—GTP, etc.). Moreover, using a particular radio technology for a specific device may not be the most efficient utilization of network resources. For example, utilizing an LTE network with GTP tunneling for a stationary machine-to-machine (M2M) device may not be the most efficient use of network resources.

SUMMARY

Simplified configuration, management, and routing of communication devices and network entities, referred to herein as mobility management, may be utilized to route information to radio access technologies (RATs) and/or cells/access points (APs), and to hand over management to network entities, based on network conditions, device conditions, or the like, or any appropriate combination thereof. In an example configuration, mobility management may incorporate software defined network (SDN) principles. For example, upon access to a network, a controller (e.g., SDN-based controller), or the like, may be utilized to control/manage routing of packets to one or more RATs and/or cells/APs based on network and/or UE conditions. Routing and control/management dynamically may be adjusted based on the best radio technology (e.g., UMTS, LTE, Wi-Fi, 5G, etc.), cell layer (e.g., macro cell and metro cell, etc.), service provider specified criteria (e.g., network load conditions, performance, subscription profile, device type, device mobility state (speed), applications, QoS, etc.), location of a device, location of a network entity, or the like, or any appropriate combination thereof.

Mobility management may be implemented in a telecommunications network in which management and control is based at least in part on the type of user equipment (UE) may comprise a routing infrastructure (control plane) that is decoupled from the switching infrastructure (data plane). This simplified telecommunications network may incorporate software defined network (SDN) principles. This simplified telecommunications network may provide a less cumbersome management and control framework for implementing wireless telecommunications. The simplified telecommunications network may enable common wireless management and control, such as mobility management, radio resource management, quality of service (QoS), load balancing, etc. across many wireless technologies, e.g., LTE, Wi-Fi, any future 5G access technologies. In this telecommunications network, connectivity may be based, at least in part, on characteristics associated with user equipment. In this telecommunications network, mobility control may be decoupled from data planes to enable independent evolution and scaling. The telecommunications network may provide flexibility in creating end-to-end services based on types of UEs and applications. The telecommunications network may provide policy based service delivery and QoS treatment to ensure better user experience and to improve UE battery life.

In an example configuration, the telecommunications network may utilize hierarchical control functions, such as mobility management, radio resource managements, etc. in distributed controllers, and other functions, such as, authentication, charging, etc. in a centralized controller(s). In an example configuration, the simplified telecommunications network may utilize an IP protocol, or the like, instead of a GPRS Tunneling Protocol (GTP). The simplified telecommunications network may be utilized to provide mobility as a service (MaaS). MaaS may be offered based on UE type, application, etc.

In an example configuration, an apparatus for f mobility management may comprise a processor and memory coupled to the processor. The memory may comprise executable instructions that when executed by the processor may cause the processor to effectuate operations. The operations may include determining device conditions pertaining to a device and determining network conditions pertaining to a first network entity with which the device is associated, wherein the device and the first network entity communication via a first address associated with the device and the first network entity. The operations further may include, based on the device conditions and the first network entity conditions, determining a second network entity with which the device is to communicate, and determining a second address for communication between the device and the second network entity, wherein the second address is based on the device conditions, the first network entity conditions, and second network entity conditions.

In an example configuration, a method for mobility management may comprise determining device conditions pertaining to a device and determining network conditions pertaining to a first network entity with which the device is associated, wherein the device and the first network entity communication via a first address associated with the device and the first network entity. The method further may include, based on the device conditions and the first network entity conditions, determining a second network entity with which the device is to communicate, and determining a second address for communication between the device and the second network entity, wherein the second address is based on the device conditions, the first network entity conditions, and second network entity conditions.

In an example configuration, a computer-readable storage medium comprising executable instruction that when executed by a processor may cause the processor to effectuate operations. The operations may include determining device conditions pertaining to a device and determining network conditions pertaining to a first network entity with which the device is associated, wherein the device and the first network entity communication via a first address associated with the device and the first network entity. The operations further may include, based on the device conditions and the first network entity conditions, determining a second network entity with which the device is to communicate, and determining a second address for communication between the device and the second network entity, wherein the second address is based on the device conditions, the first network entity conditions, and second network entity conditions.

BRIEF DESCRIPTION OF THE DRAWINGS

Aspects of the herein described mobility management are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

DETAILED DESCRIPTION OF ILLUSTRATIVE EMBODIMENTS

As described herein, mobility management including hand over functions may be based on device (e.g., user equipment—UE) type, an application, device conditions, network conditions, a type of cell or access point, a location of a device, a location of a network entity, management/control assignments to network entities, or the like, or any appropriate combination thereof. Mobility management may comprise packet routing based on an Internet protocol (IP). In various configurations, an IP address may be assigned based on UE type, type of application, network conditions, a type of cell or access point, managing/controlling network entity, or the like, or any appropriate combination thereof.

Different radio technologies (e.g., Wi-Fi, cellular, etc.) may use different management and control mechanisms. Even within the 3GPP cellular technologies, 2G, 3G, LTE may use different management/control and may require extensive interfaces among them. Cellular network management and signaling may treat all end points equally. This may work for the existing types of devices, such as, for example, smart devices. However, with the growing use of machine-to-machine (M2M) and Internet of things (IoT) type devices, which may tend to be stationary, using existing management/control mechanism of provisioning/maintaining complex GTP tunnels may not be the most cost effective utilization of network resources. For example, a meter-reader type of device may not need mobility treatment, may not need to participate in load balancing, and may not need to participate in an intelligent access network selection (IANS). This may be especially applicable to the new paradigm of 5G technologies, which may embrace mosaic types of radio access network (RAN) technologies.

Figure 1:
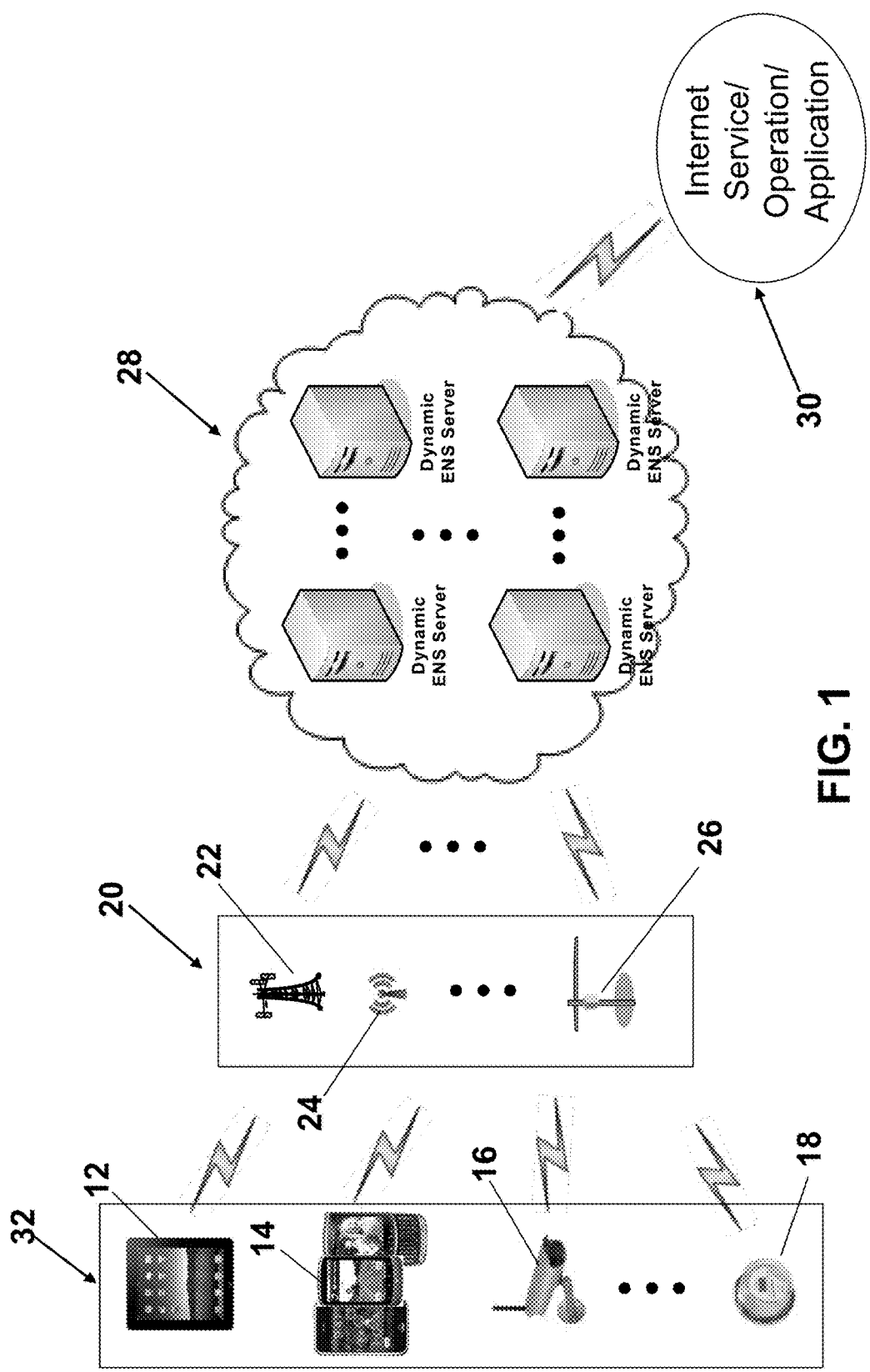
FIG. 1 illustrates an example telecommunication system for facilitating mobility management.

FIG. 1 illustrates an example telecommunication system that may be utilized to facilitate mobility management. As shown in FIG. 1, user equipment 32 may request a service, execute an application, perform an operation, or the like, from entity 30, via radio access technology 20 and a simplified telecommunications network 28. As depicted in FIG. 1, user equipment 32 may comprise any appropriate type of user equipment, such as, for example, a tablet 12, a smart phone 14, a camera 16, a meter 18, or the like, or any appropriate combination thereof. Camera 16 and meter 18 may be examples of machine-to-machine (M2M) devices that are stationary. It is to be understood that the user equipment 32 as depicted in FIG. 1 is exemplary and not intended to be limiting.

User equipment may gain access to network 28 via any appropriate mechanism. For example, as depicted in FIG. 1, access to network 28 may be provided via cellular infrastructure, Wi-Fi infrastructure, hot spots, or the like, or any appropriate combination thereof. FIG. 1 depicts, as examples, a macro cell 22 (e.g., LTE, 5G, etc.), a Wi-Fi access point 24, and a micro or metro cell 26. It is to be understood that the infrastructure 20 as depicted in FIG. 1 is exemplary and not intended to be limiting.

As described in more detail herein, the network 28 may provide management, control, and interconnectivity functionality for the telecommunications system depicted in FIG. 1. The network 28 may provide hierarchical control of telecommunications functions, such as, for example, mobility management, radio resource managements, intelligent access selection, load balancing, quality of service (QoS), authentication, handover, charging, or the like, or any appropriate combination thereof. In an example configuration, the network 28 may utilize a simple Internet protocol instead of GTP. Thus, rather than providing telecommunications services to user equipment via a complex tunneling mechanism, such as GTP, the network 28 may provide telecommunications services based on characteristics of the user equipment and the type of service requested.

Figure 2:
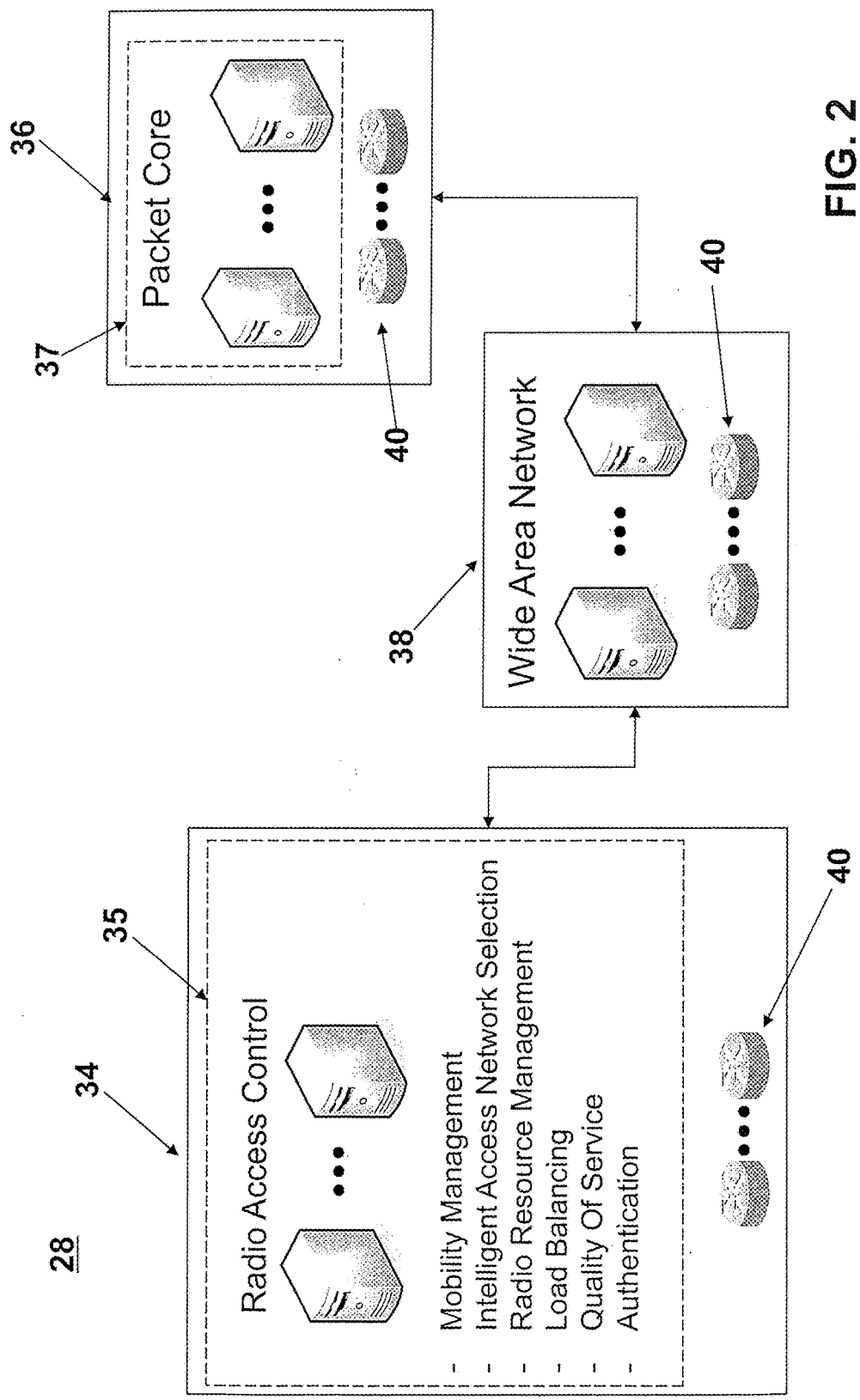
FIG. 2 is another depiction of an example telecommunication network for facilitating mobility management.

FIG. 2 is another depiction an example telecommunication network 28 that may be utilized to facilitate mobility management. The management and control network 28 may perform and/or effectuate various management and/or control functions. For example, the management and control network 28 may perform/effectuate radio access control, packet formatting and distribution, wide area network connectivity configuration, routing and switching, or the like, or any appropriate combination thereof. In an example configuration, the network 28 may comprise a radio access portion 34 for performing radio access control functions, a packet core portion 36 for performing packet formatting and distribution functions, billing functions, authentication functions, policy related functions, a wide area network (WAN) portion 38 for performing wide area network connectivity functions, a routing/switching portion 40 for performing routing and switching functions, or the like, or any appropriate combination thereof. In an example configuration, functionality may be performed by a virtual machine, or the like, which may be instantiated via Orchestrator workflow automation. And routing/switching configuration may be communicated via an Openflow protocol, or the like, to a forwarding plane of the network 28. As depicted in FIG. 2, the portion of radio access portion 34 within dashed lines 35 and the portion of packet core portion 36 within dashed lines 37 may be considered as components of a control plane of the system 28. And the routing/switching portion 40 may be considered elements of a forwarding plane of the system 28.

The radio access portion 34 may provide hierarchical control of telecommunications functions, such as, for example, mobility management, radio resource managements, intelligent access selection, load balancing, quality of service (QoS), authentication, handover, charging, or the like, or any appropriate combination thereof. Mobility management may comprise attaching a UE to the network 28, attaching a UE to radio access infrastructure/technology 20, detaching a UE from the network 28, detaching a UE from radio access infrastructure/technology 20, handover functions from one radio access infrastructure/technology to another radio access infrastructure/technology, handover functions from one cell to another within the same radio access technology, or the like, or any appropriate combination thereof. Intelligent access selection may comprise policy driven/based access network selection for choosing an appropriate radio access technology (RAT)/radio access infrastructure on a per UE basis, on a per application basis, or any appropriated combination thereof. Radio resource management may include scheduling functions, resource allocation functions, or the like, or any appropriate combination thereof. In an example aspect, scheduling and resource allocation may be based UE requirements and available radio resources at each cell. Scheduling and resource allocation may be accomplished without regard of which physical resource block (PRB) is being used. Load balancing may be accomplished within a radio technology, across all radio technologies, or any appropriate combination thereof. A requested QoS may be provided based on a particular UE, application, and available resources.

The packet core portion 36 may perform/effectuate functions via an Internet protocol (IP). In an example configuration, all communications with and within the packet core portion 36 may be via an Internet protocol. The packet core portion 36 may perform and/or effectuate mobility management. In an example configuration, the packet core portion 36 may perform and/or effectuate mobility management, anchoring the user plane (e.g., managing hand over, user data traffic, voce packets, signaling, control, etc.) for inter-eNB handover and inter-3GPP mobility, between 3GPP and non-3GPP, QoS management functions, policy related functions, or the like, or any appropriate combination thereof, in accordance with any appropriate authentication functions and/or policies.

The wide area network portion 38 may perform functions related to providing access to any appropriate network, such as, for example, a backhauling network, connect a RAN to a packet core network, or the like, or any appropriate combination thereof.

Routing/switching portion 40 may configure routing and/or switching functionality/connections. Routing/switching portion 40 may facilitate transfer of information within the network 28, and to networks and entities external to the network 28. Routing and switching may be accomplished via any appropriate protocol and/or standard. In an example configuration, routing and switching may be effectuated via Openflow.

The telecommunications network 28 may provide a common infrastructure for effectuating telecommunication functions. The unique paradigm of a mobility network provided by the telecommunications network 28 shifts away from a separate mobility network with the special built S-GW, P-GW, MME, etc. and traditionally expensive network elements. Mobility control functions may be provided as services that leverage the telecommunications network's 28 capability of configuring and forwarding elements.

Figure 3:
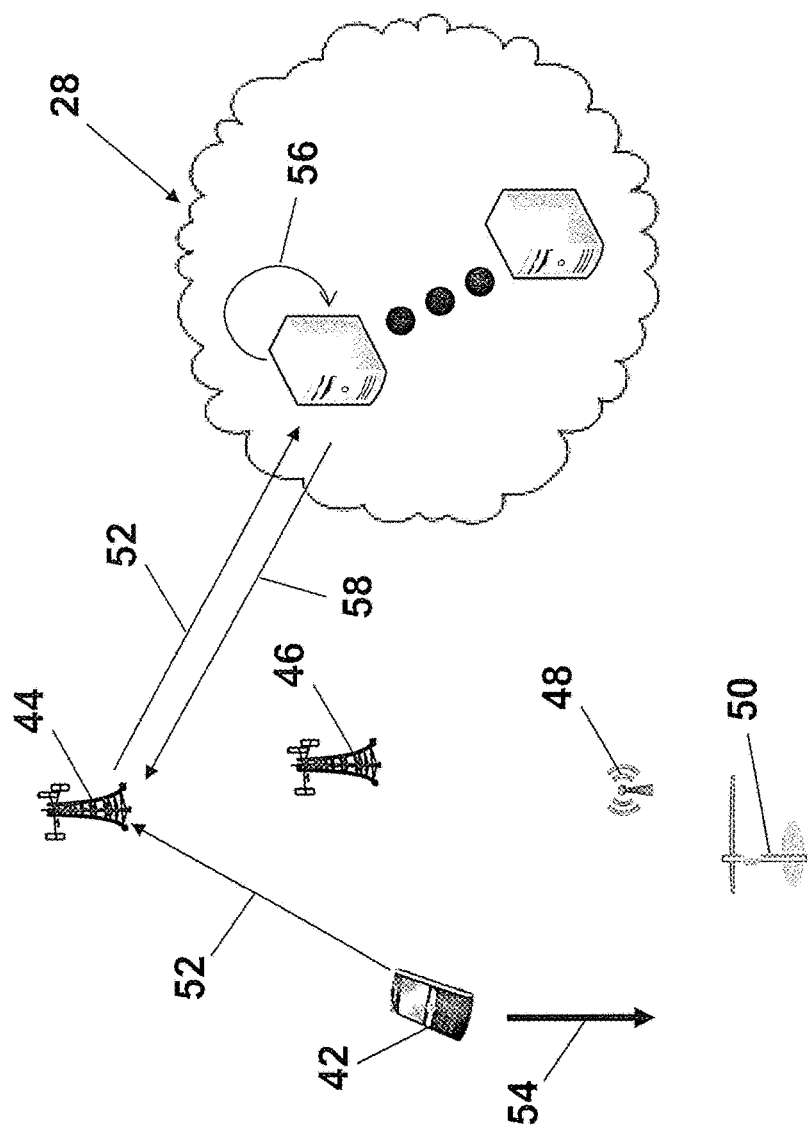
FIG. 3 illustrates an example system and process for mobility management.

FIG. 3 illustrates an example system and process for mobility management. As depicted by arrow 54 in FIG. 3, UE 42 is moving from cell towers 44 and 46 toward Wi-Fi access point 48 and cell tower 50. At step 52, the UE 42 may report, to a server/controller in the telecommunications network 28, via cell tower 44, that the UE 42 is receiving weak radio frequency (RF) signals from cell tower 44 and cell tower 46. The UE 42 also may provide an indication to the telecommunications network 28 that the RF signal being received from the serving cell(s) are weak. Also at step 52, the UE 42 may provide an indication that the UE 42 is receiving good RF signals from Wi-Fi access point 48 and cell tower 50, and that Wi-Fi access point 48 and cell tower 50 may be good candidate targets to effectuate a handoff. Additionally, the cell tower 44 may provide information to the telecommunications network 28 regarding buffer status for the UE 42. Buffer status may include an indication as to whether there are any packets queued in the buffer for the UE 42. The telecommunications network 28 may evaluate the information received from the cell tower 44 regarding the UE 42 at step 56. Based on the buffer status, the indicated RF signal strengths, any operator policies, or the like, or any appropriate combination thereof, the telecommunications network 28 may decide, at step 56, that cell tower 50 is the appropriate target cell. The telecommunications network 28 may instruct the cell tower 44, at step 58, to forward the downstream packets arrived/queued at the cell tower 44 to the target cell tower 50 to avoid packet loss. Optionally the packets queued in cell tower 44 may be dropped and the underlying application and/or protocol may be relied on to recover the packet loss. In various configurations, as described below, a controller, or controllers, in network 28 may determine routing based on, for example, UE type, type of application, network conditions, type of cell or access point, or the like, or any appropriate combination thereof.

Figure 4:
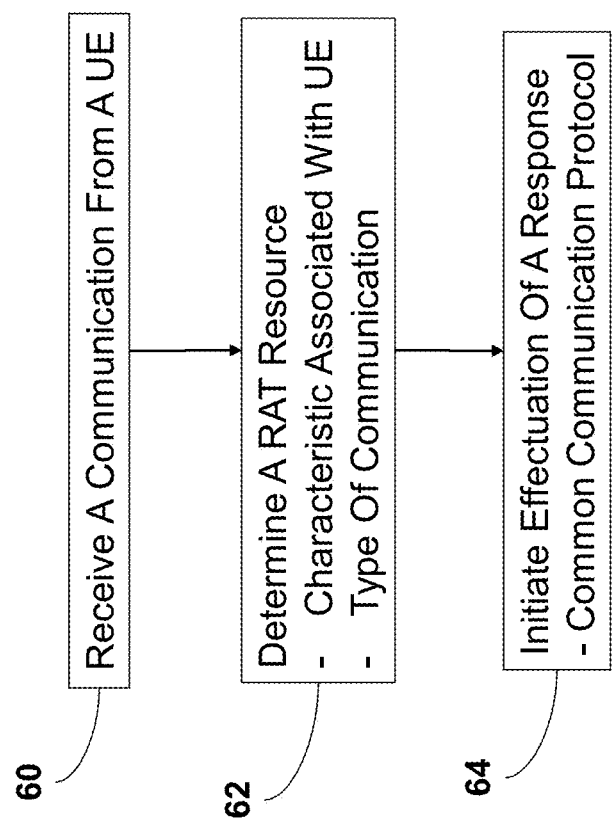
FIG. 4 is an example flow diagram of a process for providing a service via a telecommunication network that may facilitate mobility management.

FIG. 4 is an example flow diagram of a process for providing a service via a telecommunication network that may facilitate mobility management. At step 60, a communication from a communication device may be received. The communication may be received, for example, by any appropriate server, controller, or the like of the telecommunications network 28. The communication may comprise any appropriate type communication. For example, the communication may comprise service request. A service request may comprise any appropriate type of service. In an example configuration, the communication may comprise a provisioning of information, such as depicted in FIG. 3 with regard to step 52.

An available radio access technology (RAT) resource may be determined at step 62. In an example configuration, an available RAT resource may be determined based, at least in part, on a characteristic associated with the UE, a type of communication, contents of the communication, a type of service requested, motion of the UE, lack of motion of the UE, a direction in which the UE is moving, network load conditions, or the like, or any appropriate combination thereof. Initiation of effectuation of a response to the communication may be provided at step 64. For example, if the communication is a service request, initiating provisioning of the service may be performed at step 64. If the communication comprises a provisioning of information, such as depicted in FIG. 3 with regard to step 52, instructions to forward a packet associated with the UE may be provided at step 64. As described below, packet routing may be determined based on UE type, type of application, network conditions, a type of cell or access point, or the like, or any appropriate combination thereof. For example, if a power meter request indicates that only a small amount of data is to be sent, 3G RAT may be selected. As another example, if a UE is moving quickly, and requests high quality video with very high speed, LTE RAT may be selected.

Figure 5:
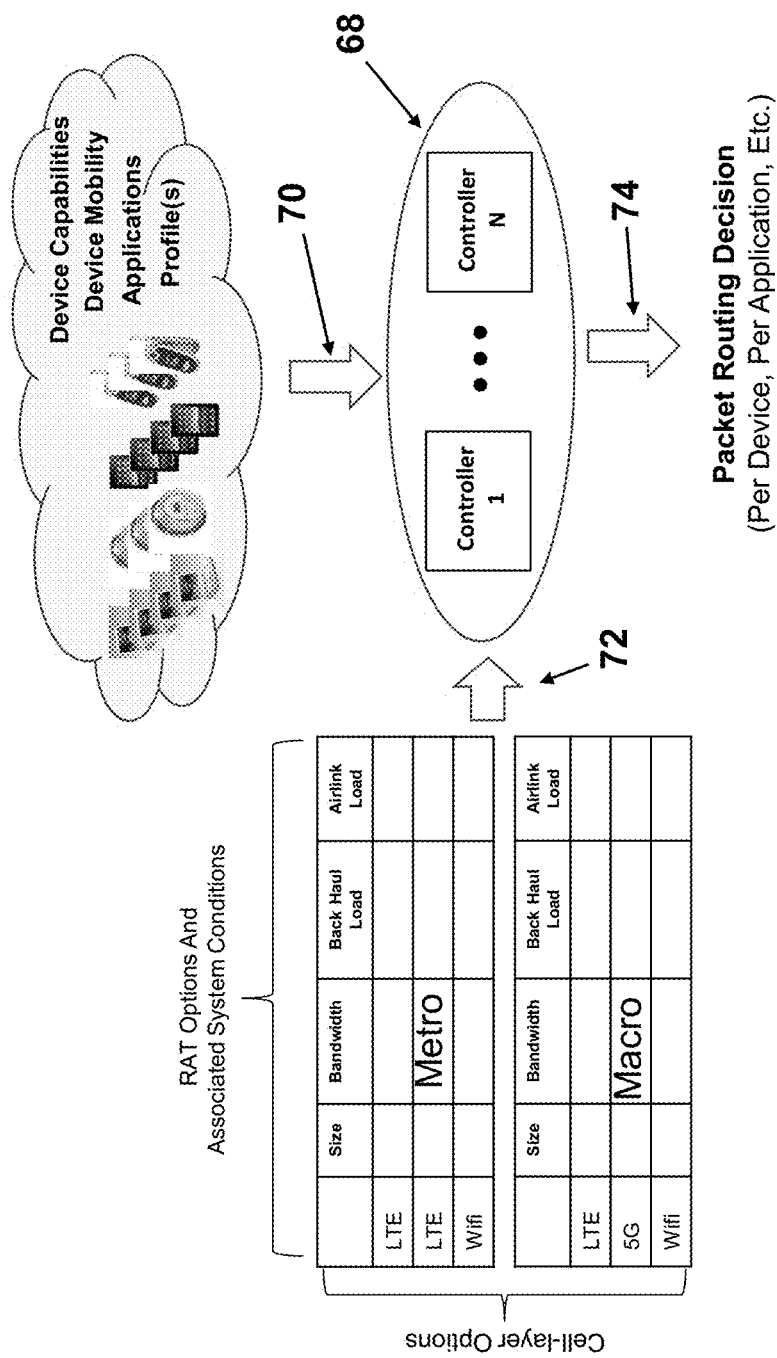
FIG. 5 illustrates an example system and process for mobility management.

FIG. 5 illustrates an example system and process for mobility management. As depicted in FIG. 5, a controller or controllers 68, or the like, may receive, at step 70, information pertaining to, for example, capabilities of a device (e.g., smart phone, 3G accessible, 4G accessible, LTE accessible, multimedia capability, etc.), capabilities of a network entity, capabilities of other controllers, the mobility status of a device (e.g., stationary, moving, speed of motion, direction of motion, velocity, etc.), an application or applications to be executed (e.g., steaming video, download image, voice, data, etc.), a profile of a subscriber or the like (e.g., high definition video, priority download, low definition video, etc.), or any appropriate combination thereof. The controller 68 may receive, at step 72, information pertaining to, for example, radio access technology (RAT) options, system configurations, network conditions, cell layer options, backhaul load, airlink load, bandwidth availability, bandwidth restrictions, network type, or the like, or any appropriate combination. At step 74, the controller 68 may determine packet routing based on the information received at step 70 and step 72.

As described in more detail below, mobility management may provide routing of information (e.g., packet routing) to various network types (e.g., Wi-Fi, cellular networks, 3G, 4G, 5G, etc.), and handover to various types of network entities (e.g., base stations, cells, controllers, eNode B, etc.) within the same RAT type and/or in different RAT types, and/or to various cell layers (e.g., macro cell, micro cell, pico cell, femto cell, umbrella cell, etc.). Handover determination may be based on, for example, service provider specified criteria, network load conditions, performance criteria, subscriber profile, device type, device mobility state, applications executing or to be executed on a device, quality of service (QoS), quality of experience (QoE), or the like, or any appropriate combination thereof.

Figure 6:
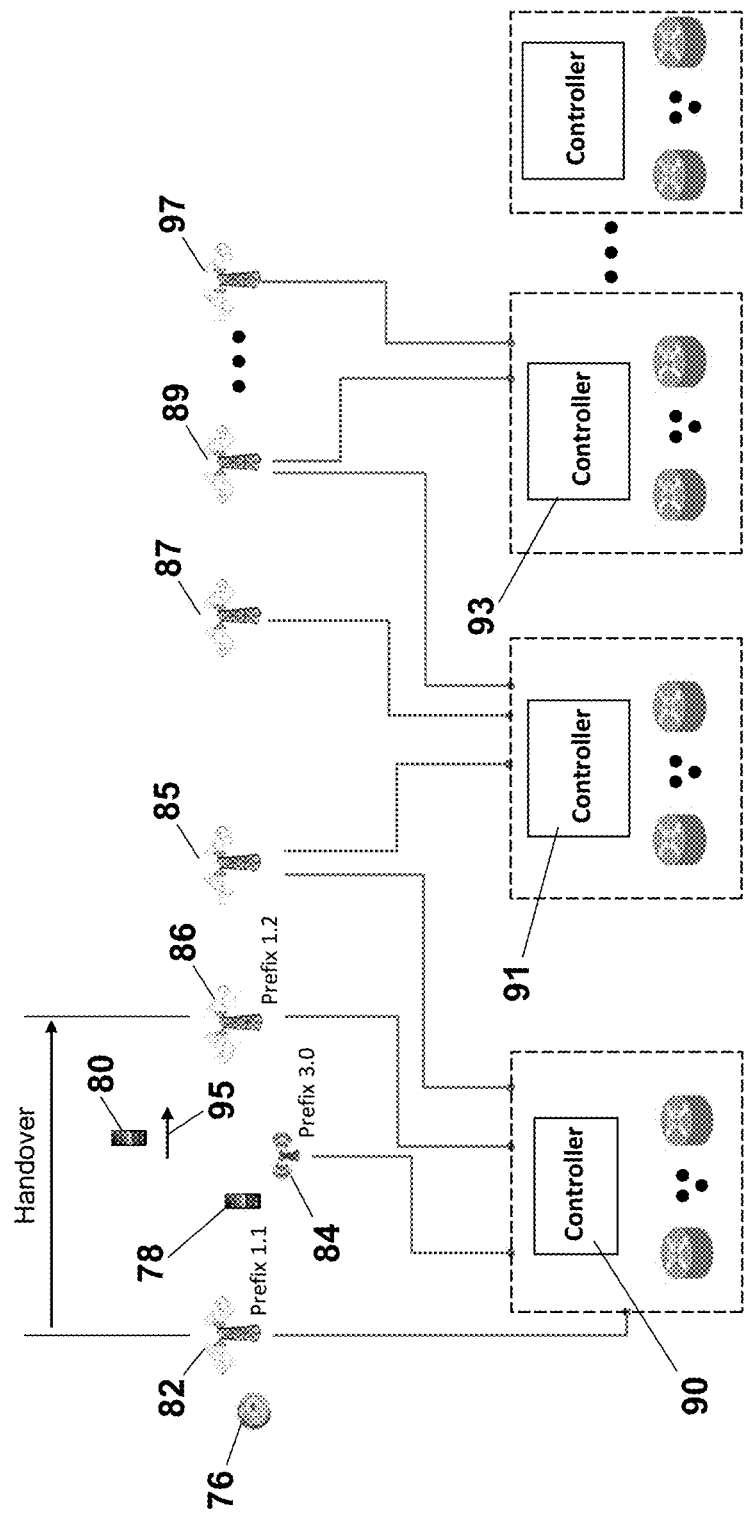
FIG. 6 is an illustration of an example system and process for mobility management.

FIG. 6 is an illustration of an example system and process for mobility management. FIG. 6 illustrate how a handover of a device from one network entity to another entity may be handled via mobility management as described herein. FIG. 6 depicts three example devices (e.g., UEs). As depicted in FIG. 6, device 76 may comprise a meter reader or the like. Device 78 may comprise a smart phone or the like. And device 80 may comprise a smart device (e.g., tablet, phablet, etc.) or the like. FIG. 6 depicts three example cell/access points (network entities). As depicted in FIG. 6, cell 82 may comprise a metro cell. Cell 86 may comprise a macro cell. And access point 84 may comprise a WiFi access point. In an example scenario depicted in FIG. 6, device 76 may be connected to (e.g., communicatively coupled to) cell 82 and have packets of information to send to cell 82. Device 78 may be connected to (e.g., communicatively coupled to) cell 82 and access point 84. Device 82 may be executing voice and video applications. Device 82 may not be moving at this time, but may desire multi-path connectivity for one or more sessions in the future. Device 80 may be connected to (e.g., communicatively coupled to) cell 82 and cell 86.

Device 80 may be moving in the direction illustrated by arrow 95. Device 80 may be moving away from network entity 82 and toward network entity 86. Device 80 may be in the process of being handed over from one network entity (e.g., cell 82) to another network entity (e.g., cell 86).

FIG. 6 depicts network entities 82, 84, 86, 85, 87, 89, and 97. Network entities 82, 84, 86, and 85 may be controlled by controller 90. Network entities, 85, 87, and 89 may be controlled by controller 91. And network entities 89 and 97 may be controlled by controller 93. A controller as described herein ma comprise any appropriate controller, such as, for example, an SDN-based controller. Cell 82, cell 86, and access point 84 may be communicatively coupled to controller 90. Controllers may manage and/or maintain network conditions and/or device conditions. In an example configuration, controller 90 may determine network condition information as depicted in table 92.

Figure 7:
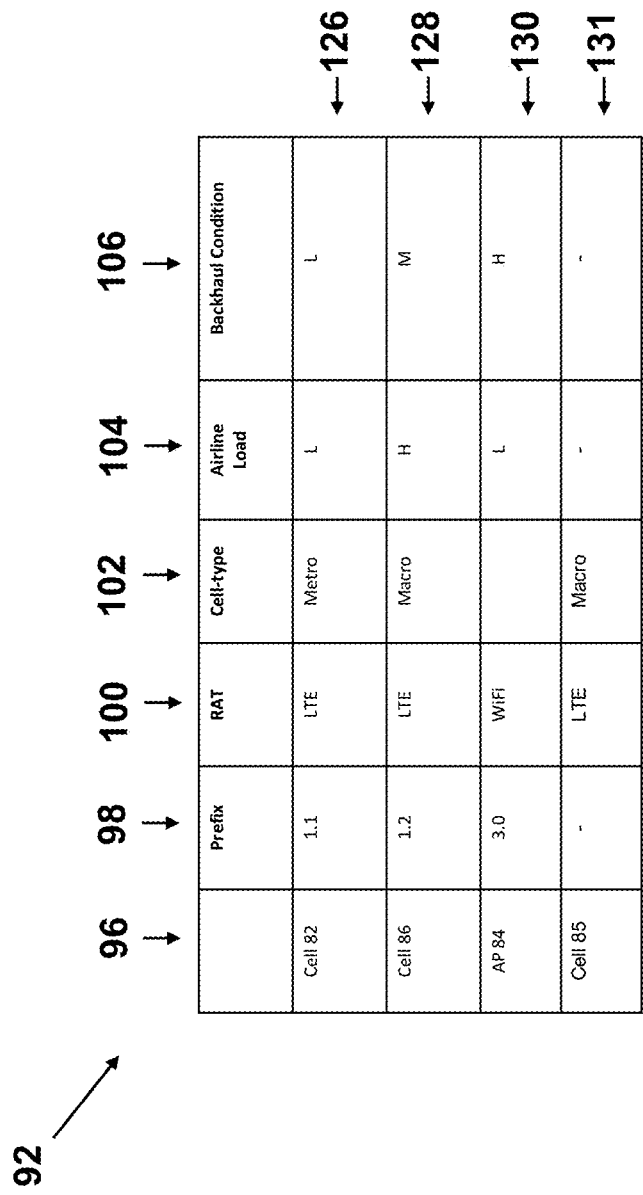
FIG. 7 shows example network table.

FIG. 7 shows example network table 92. Network table 92 may comprise any appropriate information pertaining to a network. In an example configuration, network table 92 may comprise an enhanced automatic network routing (E-ANR) table. As depicted in FIG. 7, network table 92 may comprise information about each cell and access point coupled to and/or managed by a controller. As shown in FIG. 7, table 92 comprises information about each cell and access point coupled to and/or controlled by controller 90. Column 96 of table 92 depicts cell 82 (row 126), cell 86 (row 128), access point 84 (row 130), and cell 85 (row 131).

To effectuate mobility management one or more IP addresses may be assigned to a device and/or network entity. In an example configuration, a controller (e.g., controller 90) may determine an IP address for each device within the purview of the controller. As depicted in table 92, column 98, row 126, the prefix for an IP address associated with cell 82 is 1.1. As depicted in table 92, column 98, row 128, the prefix for an IP address associated with cell 86 is 1.2. As depicted in table 92, column 98, row 130, the prefix for an IP address associated with access point 84 3.0. No prefix is shown for cell 85 in table 92 for the sake of simplicity because cell 85 is not involved in the handover of device 80 from cell 82 to cell 86. However, any appropriate prefix may be assigned to cell 85, as described herein. It is to be understood that the prefixes shown in table 92 are examples, and not to be construed as limiting. Thus, any appropriate prefix may be assigned to a cell/access point (network entity). As shown in table 92, the radio access technology (RAT) type for each cell/access point (network entity) may be listed. For example, column 100, row 126 indicates that cell 82 is an LTE cell. Column 100, row 128 indicates that cell 86 is an LTE cell. Column 100, row 130 indicates that access point 84 is a WiFi access point. And column 100, row 131 indicates that cell 85 is an LTE cell. As shown in table 92, the cell type for each cell may be listed. For example, column 102, row 126 indicates that cell 82 is a metro cell, column 102, row 128, indicates that cell 86 is a macro cell, and column 102, row 131 indicates that cell 85 is a macro cell. Other example cell types may include femto cell type, pico cell type, umbrella cell type or the like.

The load for a cell may be included in the network table. For example, as depicted in table 92, airline load and backhaul load may be listed. As depicted in table 92, column 104, row 126, the airline load for cell 82 is low (L) (e.g., approximately 30% loaded). As depicted in table 92, column 106, row 126, the backhaul load for cell 82 is low (L) (e.g., approximately 30% loaded). As depicted in table 92, column 104, row 128, the airline load for cell 86 is high (H) (e.g., approximately 80% loaded). As depicted in table 92, column 106, row 128, the backhaul load for cell 86 is medium (M) (e.g., approximately 65% loaded). As depicted in table 92, column 104, row 130, the airline load for access point 84 is low (L) (e.g., approximately 30% loaded). As depicted in table 92, column 106, row 130, the backhaul load for access point 84 is high (H) (e.g., approximately 80% loaded). Controller 90 may determine load in any appropriate manner. For example, example an LTE eNB may monitor and report the utilization of data and control channels according to the percentage of time these resources are idle and available over a specified time interval.

Figure 8:
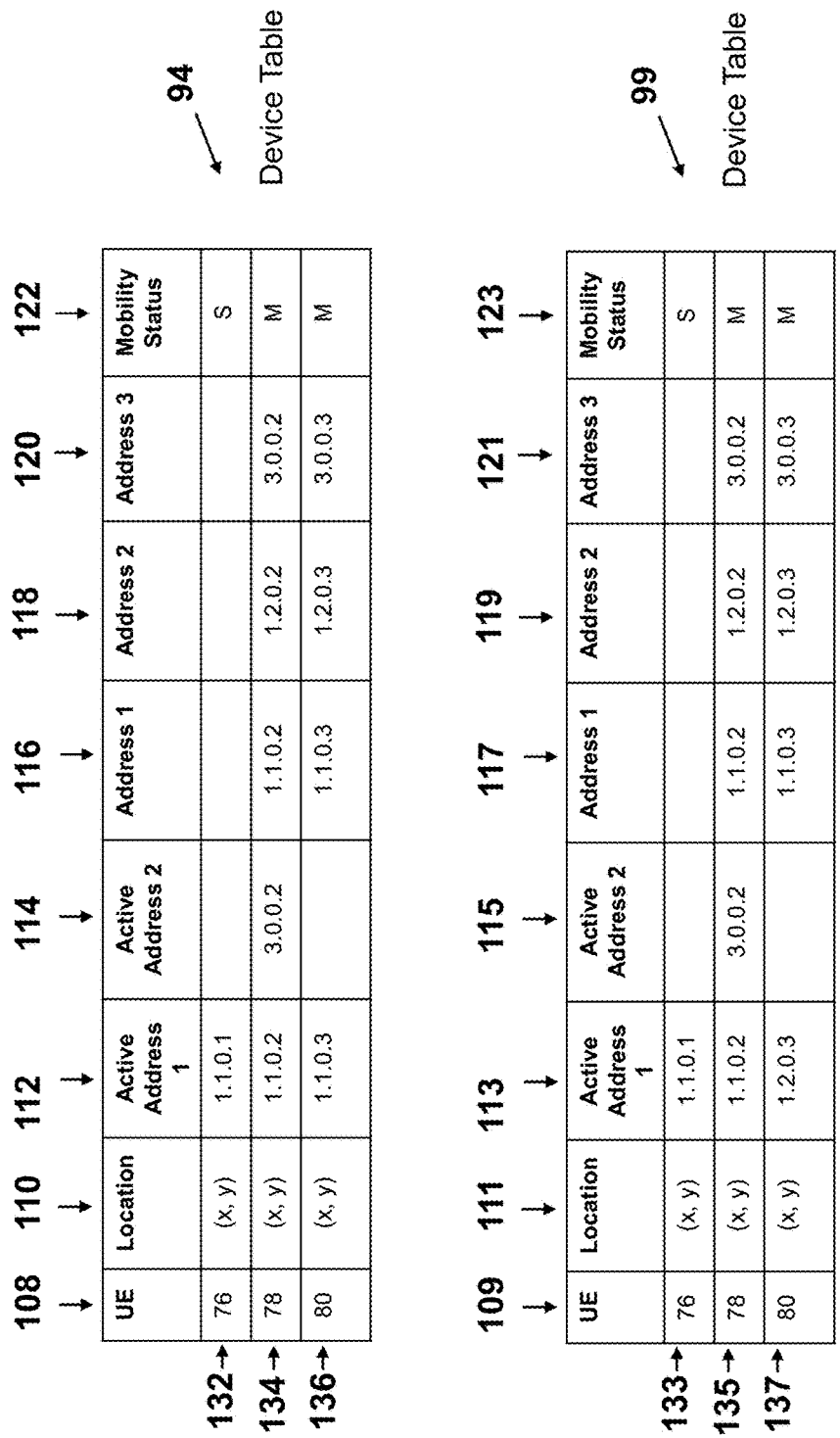
FIG. 8 depicts example device tables pertaining to a device before and after a handover.

A controller may generate, update, and/or maintain information pertaining to a device or devices. FIG. 8 depicts example device tables pertaining to a device before and after a handover. Device table 94 depicts device information pertaining to devices associated with controller 90 prior to the handover of device 80 from cell (network entity) 82 to cell (network entity) 86. Device table 99 depicts device information pertaining to devices associated with controller 90 after the handover of cell 80 from cell (network entity) 82 to cell (network entity) 86.

As shown in FIG. 8, a device table may comprise information about each device coupled to and/or in communication with (associated with) a cell, access point, or the like that is coupled to and/or controlled by a controller. Thus, as devices move in and out of communication range with a cell/access point (network entity) associated with controller 90, information in a device table may be updated. As depicted in device table 94 and table 99, devices are listed in column 108 and 109, respectively. Devices may be listed in any appropriate manner. For example, columns 108, 109 may comprise identifiers that respectively identify each device associated with controller 90. Identifiers may comprise any appropriate identifier, such as, for example, a phone number, a device ID, a serial number, an International Mobile Subscriber Identity ("IMSI") number, a random number, a quasi-random number, a number from a sequence of numbers, a number determined by controller 90, or the like, or any appropriate combination thereof.

As shown in device table 94, device 76 is identified at a cell located at column 108 and row 132. For the sake of clarity, cell locations are identified herein by parenthetically bound column number and row number. For example, device 76 is identified at cell (108,132), device 78 is identified at cell (108,134) and cell (108, 136), and device 80 is identified at cell (108,138).

Device tables may comprise profile information. Profile information may comprise information pertaining to a device and/or a person/entity associated with a device. Profile information may comprise any appropriate information describing an aspect, characteristic, preference, membership, subscription, etc. of a device and/or a person/entity associated with the device. For the sake of simplicity, specific profile information is not depicted in table 94 or table 99.

Device tables may comprise application information. Application information may comprise information pertaining to an application, or applications, executing and/or to be executed on a device. Example application may include meter applications, voice applications, YouTube applications, or the like. For the sake of simplicity, specific application information is not depicted in table 94 or table 99.

Device tables may comprise various addresses for devices/cell/access points. In example configurations, controller 90 may determine an address, or addresses, for a device and an associated cell/access point (network entity) based on the prefix of the cell/access point(s) to which the device is coupled, other addresses in use (currently assigned), handover information, location, or the like. In an example configuration, an address may comprise a prefix that identifies a cell/access point (network entity) and a suffix that identifies a device. Prefixes and suffixes may be any appropriate size, or sizes, such as, for example, 16 bits, 32 bits, 64 bits, 128 bits, or the like, or any appropriate combination thereof. Any appropriate addressing protocol may be utilized, such as, for example, an Internet protocol, any appropriate version of an Internet protocol (e.g., IPv6, IPv4, etc.), or the like, or any appropriate combination thereof.

As shown in FIG. 7, the prefix for cell 82 is 1.1. As shown in device table 94 and table 99 of FIG. 8, the address suffix for device 76 is 0.1 (110, 132; and 113, 133), the address suffix for device 78 is 0.2 (112, 134; and 113, 135), and the address suffix for device 80 is 0.3 (112, 136; and 113, 137).

It is to be understood that the addresses illustrated herein are examples and not to be limited thereto. For example, an address suffix may comprise a host address of a device. In an example configuration, a controller may generate an address prefix and append it to a device host address to generate an address.

A controller may maintain information regarding a location of a device. Column 110 of device table 94 and column 111 of device table 99 indicate location information. For example, the location of device 76 prior to the handover of device 80 from cell (network entity) 82 to cell (network entity) may be depicted at column 110, row 132 of device table 94. The location of device 78 prior to the handover of device 80 from cell (network entity) 82 to cell (network entity) may be depicted at column 110, row 134 of device table 94. The location of device 80 prior to the handover of device 80 from cell (network entity) 82 to cell (network entity) may be depicted at column 110, row 136 of device table 94. The location of device 76 after handover of device 80 from cell (network entity) 82 to cell (network entity) may be depicted at column 111, row 133 of device table 99. The location of device 78 after the handover of device 80 from cell (network entity) 82 to cell (network entity) may be depicted at column 111, row 135 of device table 99. The location of device 80 after the handover of device 80 from cell (network entity) 82 to cell (network entity) may be depicted at column 111, row 137 of device table 99. Specific location information is not shown in table 94 or table 99 for the sake of simplicity.

A controller may maintain (e.g., in device table 94 and device table 99) an indication as to which addresses are active (in use) regarding a device and a cell/access point (network entity). As shown in columns 112 and 114 of device table 94, prior to the handover of device 80 from cell (network entity) 82 to cell (network entity) 86, device 76 may be active via cell 82 (112,132), device 78 may be active via cell 86 (112, 134) and via access point 84 (114, 134), and device 80 may be active via cell 82 (114, 136). As shown in columns 113 and 115 of device table 99, after the handover of device 80 from cell (network entity) 82 to cell (network entity), device 76 still may be active via cell 82 (113,133), device 78 still may be active via cell 86 (113, 135) and via access point 84 (115, 135), and device 80 may be active via cell 86 (113, 137). Thus, the active address for device 80 changed from 1.1.0.3 prior to the handoff of device 80 from cell (network entity) 82 to cell (network entity) 86, to 1.2.0.3 after the handoff of device 80 from cell (network entity) 82 to cell (network entity) 86. Specifically, in this example, the prefix of the address of device 80 changed to indicate the new network entity associated with device 80.

Other addresses (not necessarily active addresses) may be maintained by a controller. For example, as depicted in device table 94, prior to the handover of device 80 from network entity 82 to network entity 86, an address for device 78 when associated with network entity 82 may be 1.1.0.2 (116, 134), an address for device 78 when associated with network entity 86 may be 1.2.0.2 (118, 134), and an address for device 78 when associated with network entity 84 may be 3.0.0.2 (120, 134). And, prior to the handover of device 80 from network entity 82 to network entity 86, an address for device 80 when associated with network entity 82 may be 1.1.0.3 (116, 136), an address for device 80 when associated with network entity 86 may be 1.2.0.3 (118, 136), and an address for device 80 when associated with network entity 84 may be 3.0.0.3 (120, 136). As depicted in device table 99, after the handover of device 80 from network entity 82 to network entity 86, an address for device 78 when associated with network entity 82 may be 1.1.0.2 (117, 135), an address for device 78 when associated with network entity 86 may be 1.2.0.2 (119, 135), and an address for device 78 when associated with network entity 84 may be 3.0.0.2 (121, 135). And, after the handover of device 80 from network entity 82 to network entity 86, an address for device 80 when associated with network entity 82 may be 1.1.0.3 (117, 137), an address for device 80 when associated with network entity 86 may be 1.2.0.3 (119, 137), and an address for device 80 when associated with network entity 84 may be 3.0.0.3 (121, 137).

A controller may maintain the mobility status of a device associated with the controller. For example, device table 94 may comprise an indication of the mobility status of a device prior to the handover of device 80 from network entity 82 to network entity 86. As shown in column 122 of device table 94, device 76 is stationary (S) (122, 132), device 78 is moving (M) (122, 134), and device 80 is moving (M) (122, 138). As depicted in device table 99, after the handover of device 80 from network entity 82 to network entity 86, device 76 may be stationary (S) (123, 133), device 78 may be moving (M) (123, 135), and device 80 may be moving (M) (123, 137).

A controller may determine to route information based, at least in part, on operator policy, network conditions, device type, device mobility status, network load conditions, etc. For example, controller 90 may determine that information sent to and received from device 76 (e.g., stationary M2M meter) be via cell (network entity) 82. This determination may be based on device 76 being camped onto cell 82, that the mobility status of device 76 is stationary, and that the load placed on the network by device 76 is low. As another example, controller 90 may determine that voice information sent to and received from device 78 (e.g., cell phone) be via cell (network entity) 86 and that video information sent to and received from device 78 be via access point (network entity) 84. This determination may be based on the profile associated with device 78 being silver, a high network load condition for cell 86, and a low load condition on access point 84. As another example, controller 90 may determine that information sent to and received from device 80 be via cell 82 and cell 86 in order to provide more bandwidth than would be available via a single cell. This determination may be based on cell 82 and cell 86 being co-channel cells (e.g., two eNBs using the same RF channel), device 80 downloading a large amount of data for an update, the profile associated with device 80 is gold, and device 80 subscribes to a very high speed service tier.

To effectuate mobility management as described herein, a controller (e.g., controller 90), or the like, may provide prefixes to the networks entities with which it is associated. For example, referring to FIG. 7, controller 90 may provide prefix values to network entity 82 (prefix value 1.1), network entity 84 (prefix value 3.0), and network entity 86 (prefix value 1.2). Each network entity may provide (e.g., broadcast) its prefix value to the devices. Each device may append its host address to each of the received prefixes to generate an address (or addresses), and use the appropriate generated address(es) when communicating with a network entity (or entities). In an example configuration, a device may broadcast to all generated addresses when sending information. A network entity in receipt of the information may further process the information based on instructions received from the controller, which may be based on information in a device table and/or a network table.

In an example configuration, network entities 82, 84, and 86 may broadcast their prefixes to devices (e.g., devices 76, 78, 80). The addresses may be formatted in accordance with any appropriate format and/or protocol. In an example configuration, addresses may be formatted in accordance with Internet protocol version 6 (IPv6), Internet protocol version 4 (IPv4), or the like, or any appropriate combination thereof.

A device, upon receipt of a prefix, or prefixes, may append its own host address to form one or multiple IP addresses, depending on the number of received prefixes. The distributed controllers (e.g., controllers 90, 91, 93) may perform mobility management functions, such as, for example, setting up tables (e.g., tables 92, 94, 99) to capture characteristics of neighbor cells/APs (network entities), to maintain device information, including adding/removing/updating device entries with location information, mobility status, candidate IP addresses associated with current or past serving cells/APs (network entities), active IP address(es), or the like, or any appropriate combination thereof. In the case of multi-homing there may be multiple active IP addresses for a device (e.g., concurrent connectivity among Wi-Fi/cellular integration ISRP, multi-path TCP, etc.).

A controller may facilitate a handover by redirecting active device flows from a previous location to a new location and dynamically configuring switching/routing information (e.g., tables) on a switch/router component in order to route user traffic to/from the proper cell(s)/AP(s) (network entities). For example, device 76, a power meter, may camp on to cell 82, and have packets of information to send. Device 76 may start the attach procedure to become authenticated. Device 76 also may append its host address (e.g., lower 64 bits of the full IPv6 address 0.1) to the prefix of cell 82 and may send its full IP address associated with cell 82 (1.1.0.1) to controller 90 during the attach procedure. Controller 90 may update the device table to enter the device information. In this case, device 76 is not going to move. Thus, it may have a relatively simple table entry with only one IP address. After device 76 finishes sending packets, it may detach after, for example, an inactivity timer times out. Subsequently, controller 90 may delete the entries associated with device 76 from the appropriate table, or tables. The foregoing example illustrates the simplicity of non-mobile access performed in a lightweight, low-state approach. The foregoing example also illustrates scalability for simple devices.

As another example, device 78 illustrates a multipath case in which device 78 is under the coverage of network entities 82 and 84. In an example configuration, device 78 may running a high bandwidth movie download and using MP-TCP. Similar to device 76, device 78 has an IP address, 1.1.0.2, associated with network entity 78. Additionally, device 78 an IP address, 3.0.0.2, associated with the Wi-Fi AP (network entity 84). Controller may discover device 78's IP addresses through its allocation (e.g., duplicate address detection—DAD). Controller 90 may add an entry to the device information table for device 78 as illustrated herein. Controller 90 may mark both IP addresses associated with network entities 82 and 84 active. Controller 90 now may provide intelligence for use of the duplicate paths. Controller 90 may resolve host addresses for device 79 such that inbound load is distributed.

As another example, device 80 may be moving away from network entity 82 toward network entity 86, and handover may occurs when appropriate handover conditions are met. As described herein, device 80 may have three valid addresses, 1.1.0.3, 1.2.0.3, 3.0.0.3. Control 90 may update the entries associated with device 80 to reflect the handover from network entity 82 to network entity 86 as described herein. After the handover, ongoing flows for network entity 82 may be sent to network entity 86, thus alleviating the need for mobility protocols such as, for example, identifier-locator network protocol (ILNP), locator identifier separation protocol-mobile node (LISP-MN), or the like.

Figure 9:
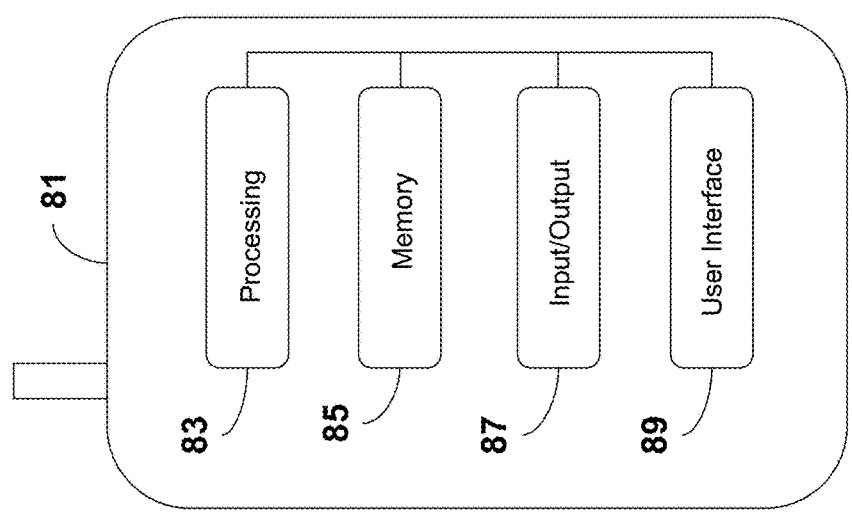
FIG. 9 is a block diagram of an example device that may be utilized with mobility management.

FIG. 9 is a block diagram of an example device 81 that may be utilized with mobility management, as described herein. The device 81 may comprise and/or be incorporated into any appropriate device, examples of which may include UE 32, UE 12, UE, 14, UE, 16, UE 18, device 76, device 78, device 80, a mobile device, a mobile communications device, a cellular phone, a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 81 can include devices that are not typically thought of as portable, such as, for example, a public computing device, a navigation device installed in-vehicle, a set top box, or the like. The mobile device 81 may include non-conventional computing devices, such as, for example, a kitchen appliance, a motor vehicle control (e.g., steering wheel), etc., or the like. As evident from the herein description, user equipment, a UE, a device, a communications device, or a mobile device is not to be construed as software per se.

The device 81 may include any appropriate device, mechanism, software, and/or hardware for mobility management, as described herein. In an example embodiment, the device 81 may comprise a processor and memory coupled to the processor. The memory may comprise executable instructions that when executed by the processor cause the processor to effectuate operations associated with a telecommunication network wherein management and control are based, at least in part, on user equipment, as described herein.

In an example configuration, the device 81 may comprise a processing portion 83, a memory portion 85, an input/output portion 87, and a user interface (UI) portion 89. Each portion of the device 81 may comprise circuitry for performing functions associated with each respective portion. Thus, each portion may comprise hardware, or a combination of hardware and software. Accordingly, each portion of the device 81 is not to be construed as software per se. It is emphasized that the block diagram depiction of device 81 is exemplary and not intended to imply a specific implementation and/or configuration. For example, in an example configuration, the device 81 may comprise a cellular communications technology and the processing portion 83 and/or the memory portion 85 may be implemented, in part or in total, on a subscriber identity module (SIM) of the device 81. In another example configuration, the device 81 may comprise a laptop computer. The laptop computer may include a SIM, and various portions of the processing portion 83 and/or the memory portion 85 may be implemented on the SIM, on the laptop other than the SIM, or any combination thereof.

The processing portion 83, memory portion 85, and input/output portion 87 may be coupled together to allow communications therebetween. In various embodiments, the input/output portion 87 may comprise a receiver of the device 81, a transmitter of the device 81, or a combination thereof. The input/output portion 87 may be capable of receiving and/or providing information pertaining to mobility management, as described herein. In various configurations, the input/output portion 87 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 83 may be capable of performing functions pertaining to mobility management, as described herein. In a basic configuration, the device 81 may include at least one memory portion 85. The memory portion 85 may comprise a storage medium having a concrete, tangible, physical structure. As is known, a signal does not have a concrete, tangible, physical structure. The memory portion 85, as well as any computer-readable storage medium described herein, is not to be construed as a signal. The memory portion 85, as well as any computer-readable storage medium described herein, is not to be construed as a transient signal. Further, the memory portion 85, as well as any computer-readable storage medium described herein, is not to be construed as a propagating signal. The memory portion 85, as well as any computer-readable storage medium described herein, is to be construed as an article of manufacture having a concrete, physical, tangible structure.

The memory portion 85 may store any information utilized in conjunction with mobility management, as described herein. Depending upon the exact configuration and type of processor, the memory portion 85 may be volatile (such as some types of RAM), non-volatile (such as ROM, flash memory, etc.), or a combination thereof. The mobile device 81 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile device 81.

The device 81 also may contain a user interface (UI) portion 89 allowing a user to communicate with the device 81. The UI portion 89 may be capable of rendering any information utilized in conjunction with mobility management, as described herein. The UI portion 89 may provide the ability to control the device 81, via, for example, buttons, soft keys, voice actuated controls, a touch screen, movement of the mobile device 81, visual cues (e.g., moving a hand in front of a camera on the mobile device 81), or the like. The UI portion 89 may provide visual information (e.g., via a display), audio information (e.g., via speaker), mechanically (e.g., via a vibrating mechanism), or a combination thereof. In various configurations, the UI portion 89 may comprise a display, a touch screen, a keyboard, an accelerometer, a motion detector, a speaker, a microphone, a camera, a tilt sensor, or any combination thereof. The UI portion 89 may comprise means for inputting biometric information, such as, for example, fingerprint information, retinal information, voice information, and/or facial characteristic information.

The UI portion 89 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user to implement mobility management, as described herein. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with discovering, negotiating, sharing, and/or exchanging information and/or capabilities.

Figure 10:
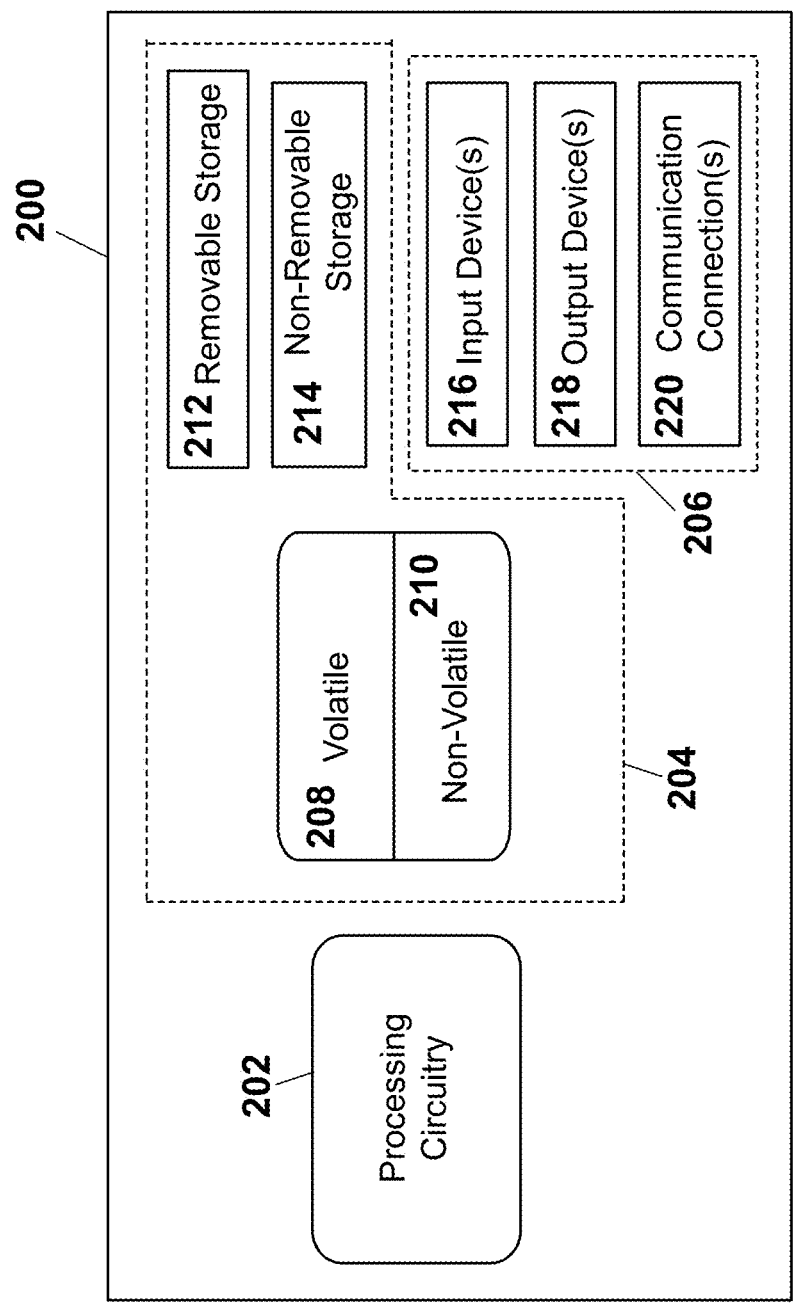
FIG. 10 is a block diagram of network entity that may be utilized to facilitate mobility management.

FIG. 10 is a block diagram of network entity of a telecommunication network (e.g., telecommunications network 28, controller 90, cell 82, cell 86, AP 84, etc.) that may be utilized to facilitate mobility management, as described herein. The network entity 90 may comprise hardware or a combination of hardware and software. In an example embodiment, the functionality to facilitate mobility management, as described herein, may reside in any one or combination of network entities. The network entity 90 depicted in FIG. 10 may represent and perform functionality of any appropriate network entity, or combination of network entities, such as, for example, a component or various components of a cellular broadcast system wireless network, a processor, a server, a gateway, a node, a MSC, a SMSC, an ALFS, a GMLC, a RAN, a SMLC, or the like, or any appropriate combination thereof. It is emphasized that the block diagram depicted in FIG. 10 is exemplary and not intended to imply a specific implementation or configuration. Thus, the network entity 90 may be implemented in a single device or multiple devices (e.g., single server or multiple servers, single gateway or multiple gateways, single controller or multiple controllers, etc.). Multiple network entities may be distributed or centrally located. Multiple network entities may communicate wirelessly, via hard wire, or any appropriate combination thereof.

In an example embodiment, the network entity 90 may comprise a processor and memory coupled to the processor. The memory may comprise executable instructions that when executed by the processor cause the processor to effectuate operations associated with mobility management, as described herein. As evident from the herein description the network entity 90 is not to be construed as software per se.

In an example configuration, the network entity 200 may comprise a processing portion 202, a memory portion 204, and an input/output portion 206. The processing portion 202, memory portion 204, and input/output portion 206 may be coupled together (coupling not shown in FIG. 10) to allow communications therebetween. Each portion of the network entity 200 may comprise circuitry for performing functions associated with each respective portion. Thus, each portion may comprise hardware, or a combination of hardware and software. Accordingly, each portion of the network entity 200 is not to be construed as software per se. The input/output portion 206 may be capable of receiving and/or providing information from/to a communications device and/or other network entities configured for mobility management, on user equipment, as described herein. For example, the input/output portion 206 may include a wireless communications (e.g., 2.5G/3G/4G/GPS) card. The input/output portion 206 may be capable of receiving and/or sending video information, audio information, control information, image information, data, or any combination thereof. In an example embodiment, the input/output portion 206 may be capable of receiving and/or sending information to determine a location of the network entity 200 and/or the communications network entity 200. In an example configuration, the input\output portion 206 may comprise a GPS receiver. In an example configuration, the network entity 200 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 206 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 202 may be capable of performing functions associated with mobility management, as described herein. For example, the processing portion 202 may be capable of, in conjunction with any other portion of the network entity 200, installing an application for mobility management, as described herein.

In a basic configuration, the network entity 200 may include at least one memory portion 204. The memory portion 204 may comprise a storage medium having a concrete, tangible, physical structure. As is known, a signal does not have a concrete, tangible, physical structure. The memory portion 204, as well as any computer-readable storage medium described herein, is not to be construed as a signal. The memory portion 204, as well as any computer-readable storage medium described herein, is not to be construed as a transient signal. The memory portion 204, as well as any computer-readable storage medium described herein, is not to be construed as a propagating signal. The memory portion 204, as well as any computer-readable storage medium described herein, is to be construed as an article of manufacture.

The memory portion 204 may store any information utilized in conjunction with mobility management, as described herein. Depending upon the exact configuration and type of processor, the memory portion 204 may be volatile 208 (such as some types of RAM), non-volatile 210 (such as ROM, flash memory, etc.), or a combination thereof. The network entity 200 may include additional storage (e.g., removable storage 212 and/or non-removable storage 214) including, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 200.

The network entity 200 also may contain communications connection(s) 220 that allow the network entity 200 to communicate with other devices, network entities, or the like. A communications connection(s) may comprise communication media. Communication media typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The network entity 200 also may include input device(s) 216 such as keyboard, mouse, pen, voice input device, touch input device, etc. Output device(s) 218 such as a display, speakers, printer, etc. also may be included.

Mobility management may be utilized in and/or in conjunction with any appropriate communications network. Some of which are described below.

Figure 11:
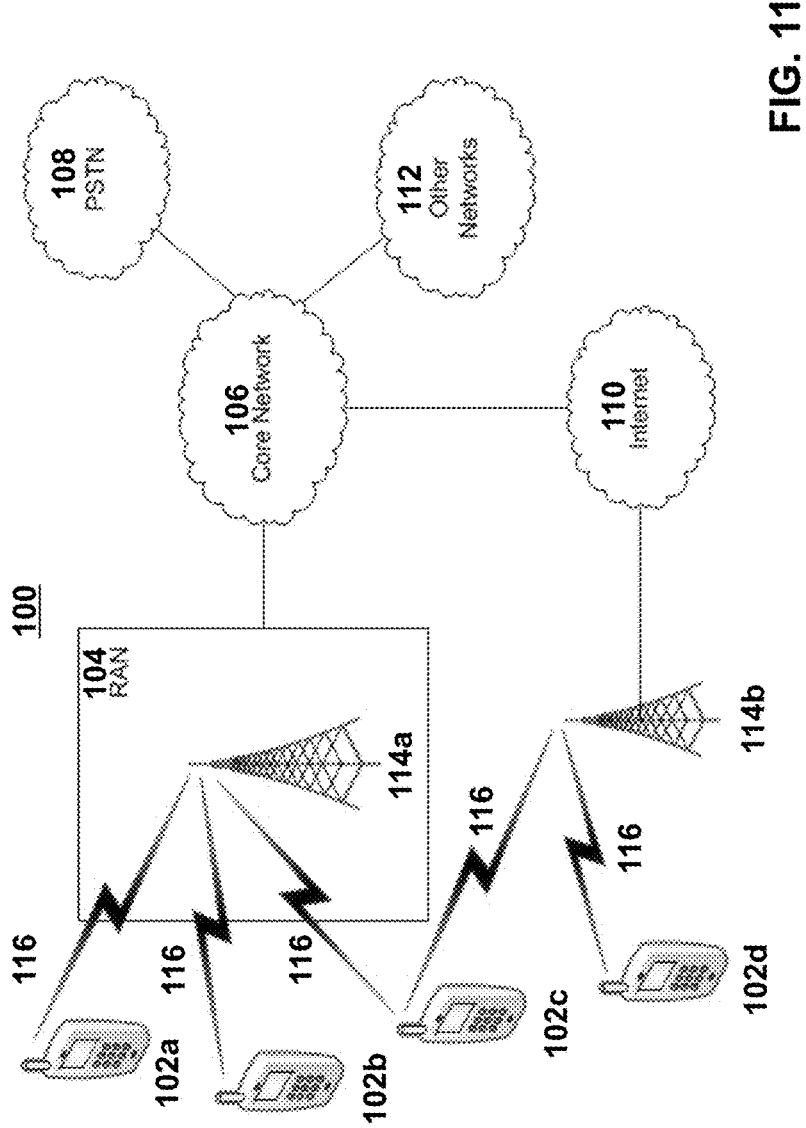
FIG. 11 is a diagram of an example communications system that may be utilized to facilitate mobility management.

FIG. 11 is a diagram of an example communications system that may be utilized to facilitate mobility management, as described herein. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 11 may also be referred to herein as a network.

As shown in FIG. 11, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. For example, a WTRU may comprise network entity 12, network entity 26, a UE, or the like, or any combination thereof. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 11 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 11, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 11, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 11 may be configured to communicate with the base station 114a, which may employ a cellular-based radio technology, and with the base station 114b, which may employ an IEEE 802 radio technology.

Figure 12:
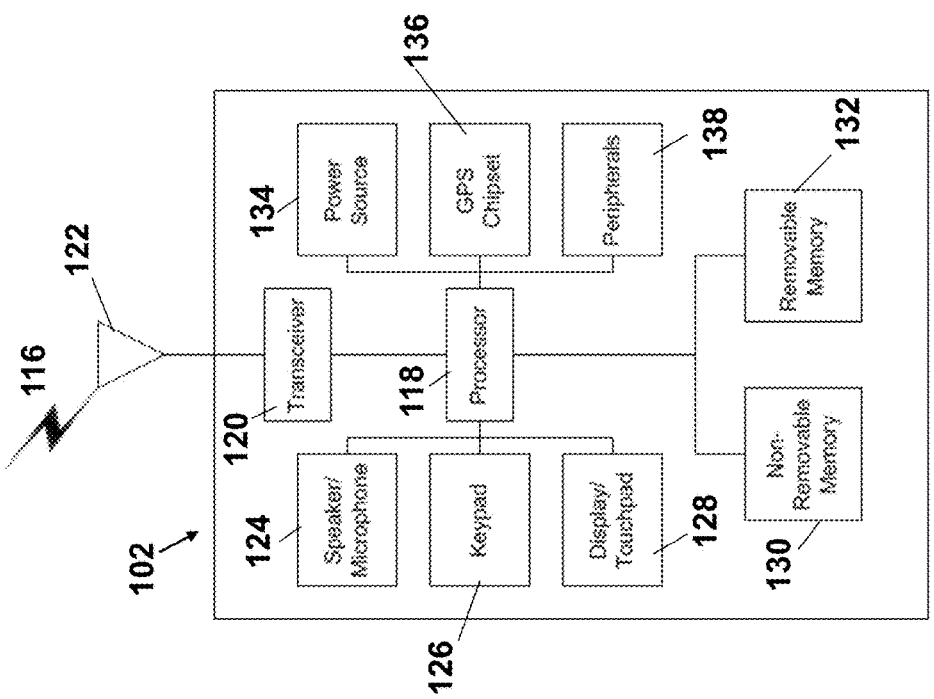
FIG. 12 is a system diagram of an example WTRU which may be utilized to facilitate mobility management.

FIG. 12 is a system diagram of an example WTRU 102 which may be utilized to facilitate mobility management, as described herein. As shown in FIG. 12, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13:
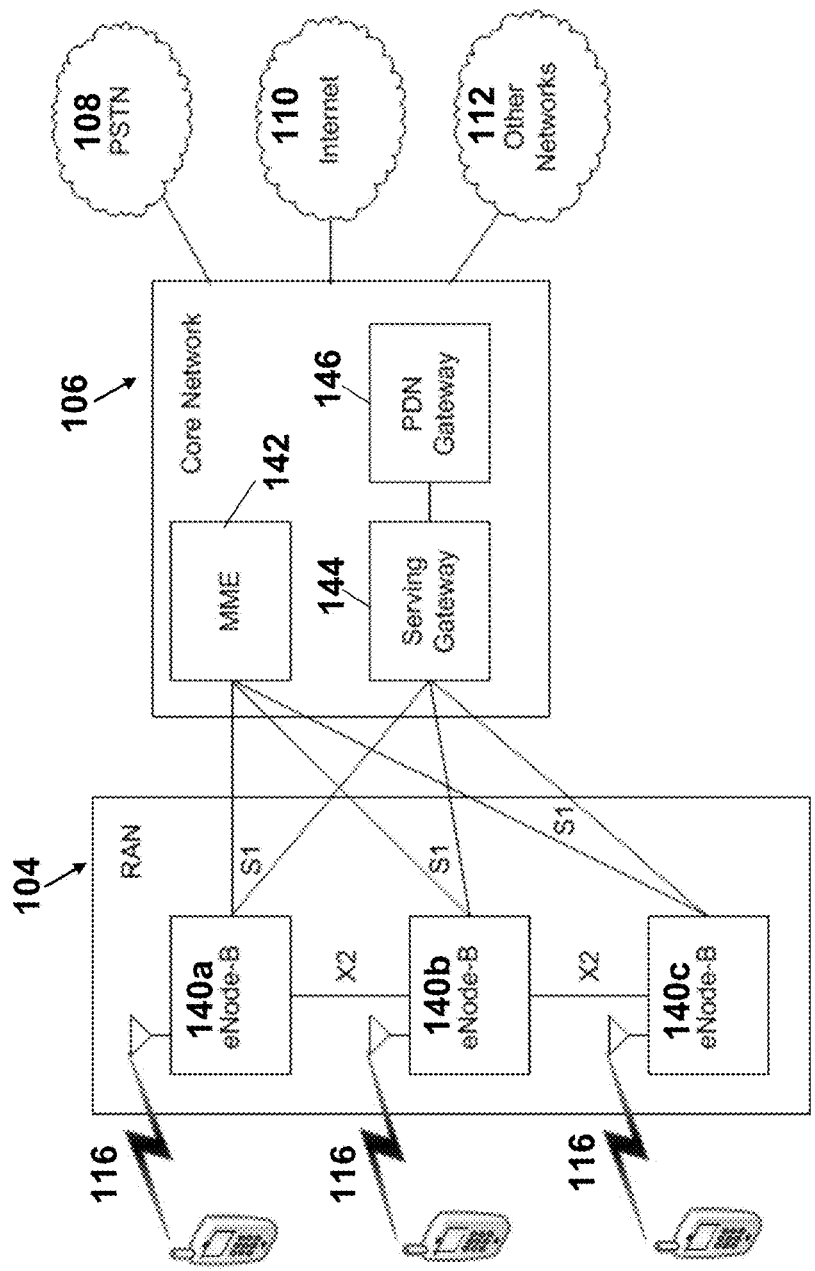
FIG. 13 is an example system diagram of RAN and a core network that may be utilized to facilitate mobility management.

FIG. 13 is an example system diagram of RAN 104 and a core network 106 that may be utilized to facilitate mobility management, as described herein. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 13, the eNode-Bs 140a, 140b, 140c may communicate with one another over an X2 interface.

The core network 106 shown in FIG. 13 may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 14:
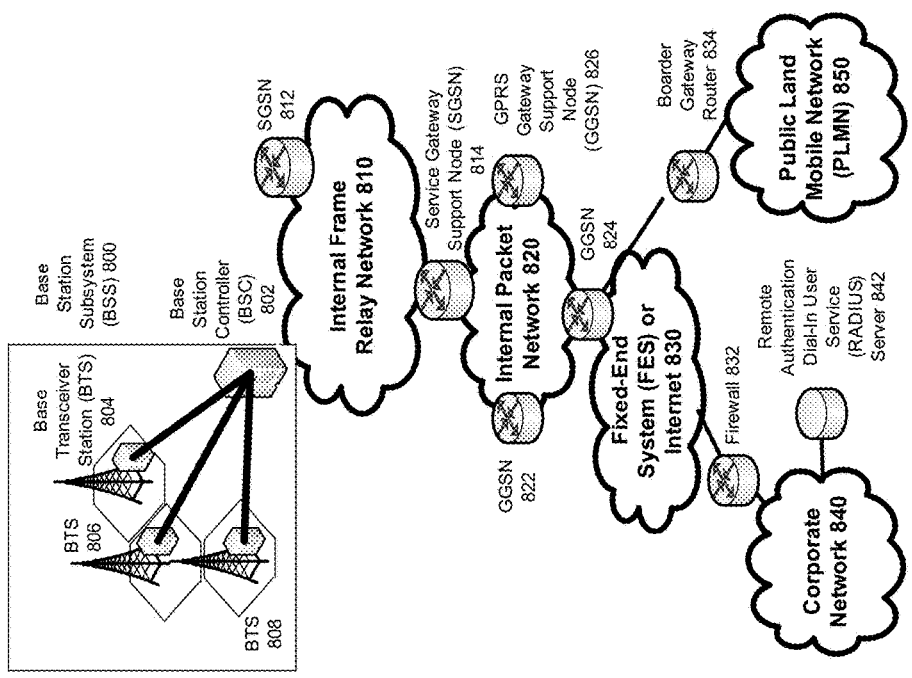
FIG. 14 depicts an overall block diagram of an example packet-based mobile cellular network environment, such as a GPRS network, that may be utilized to facilitate mobility management.

FIG. 14 depicts an overall block diagram of an example packet-based mobile cellular network environment, such as a GPRS network, that may be utilized to facilitate mobility management, as described herein. In the example packet-based mobile cellular network environment shown in FIG. 14, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 15:
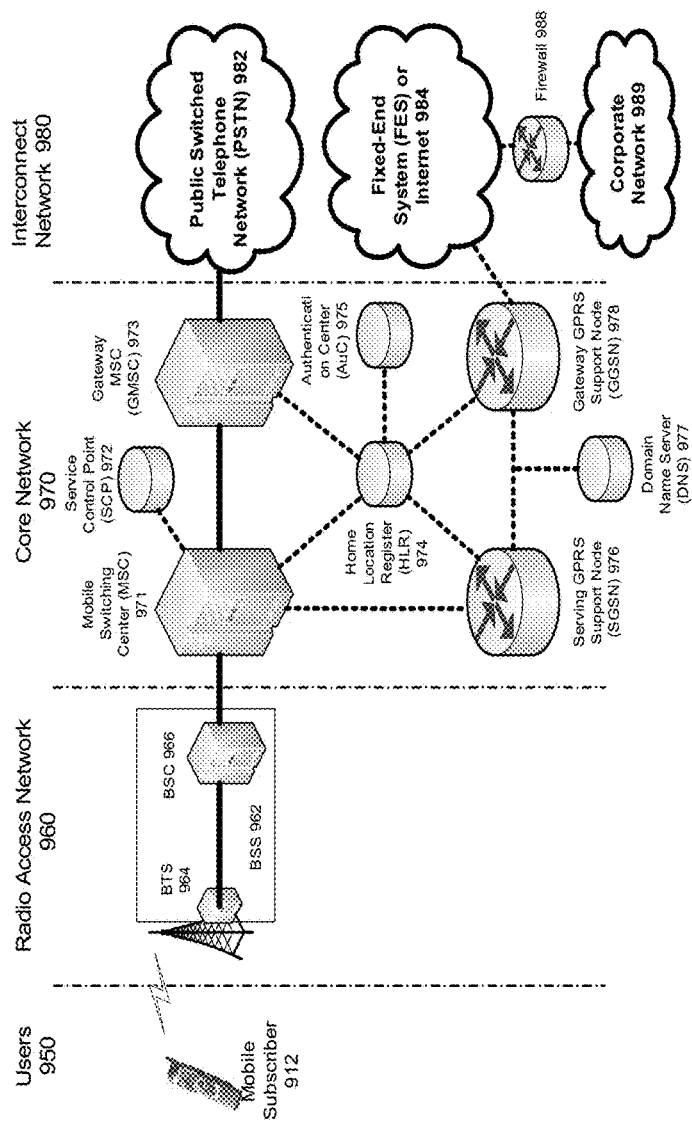
FIG. 15 illustrates an architecture of a typical GPRS network that may be utilized to facilitate mobility management.

FIG. 15 illustrates an architecture of a typical GPRS network that may be utilized to facilitate mobility management, as described herein. The architecture depicted in FIG. 15 may be segmented into four groups: users 950, radio access network 960, core network 970, and interconnect network 980. Users 950 comprise a plurality of end users. Note, device 912 is referred to as a mobile subscriber in the description of network shown in FIG. 15. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 15, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 15, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 15, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 16:
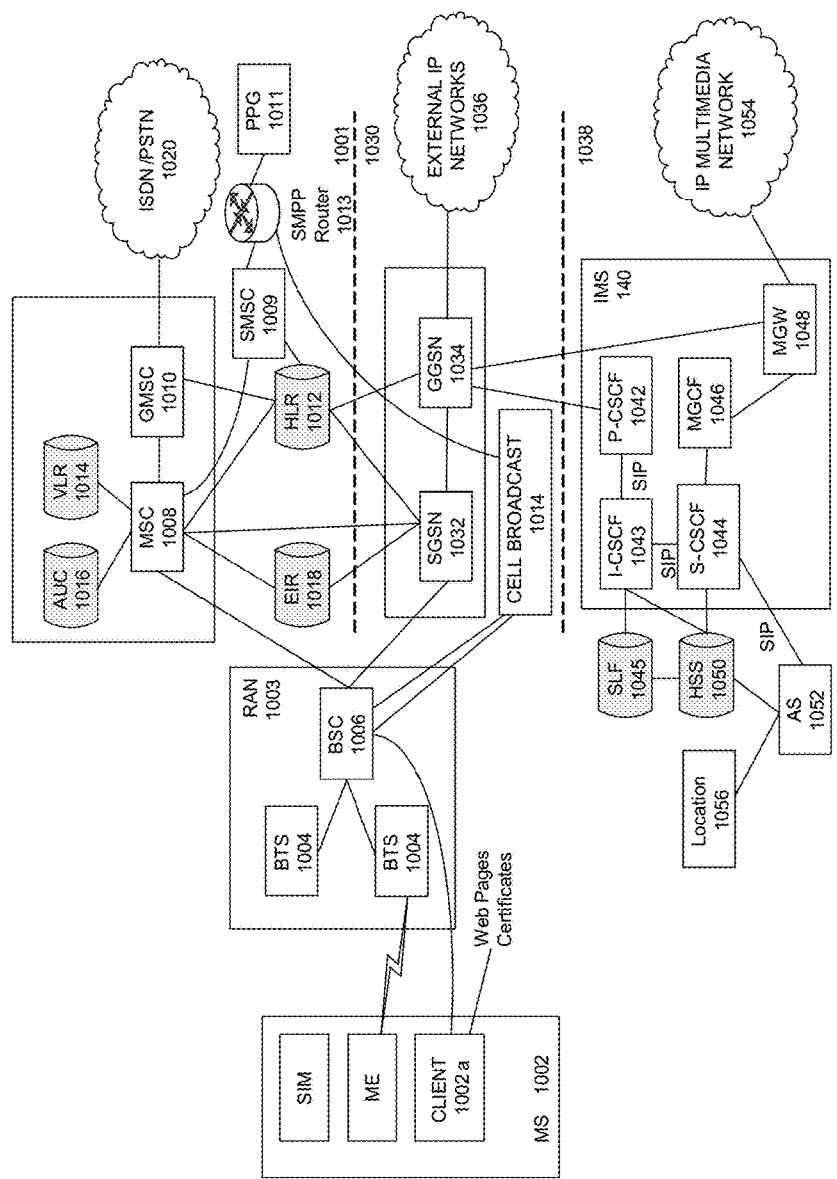
FIG. 16 illustrates an example block diagram view of a GSM/GPRS/IP multimedia network architecture that may be utilized to facilitate mobility management.

FIG. 16 illustrates an example block diagram view of a GSM/GPRS/IP multimedia network architecture that may be utilized to facilitate mobility management, as described herein. As illustrated, the architecture of FIG. 16 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 17:
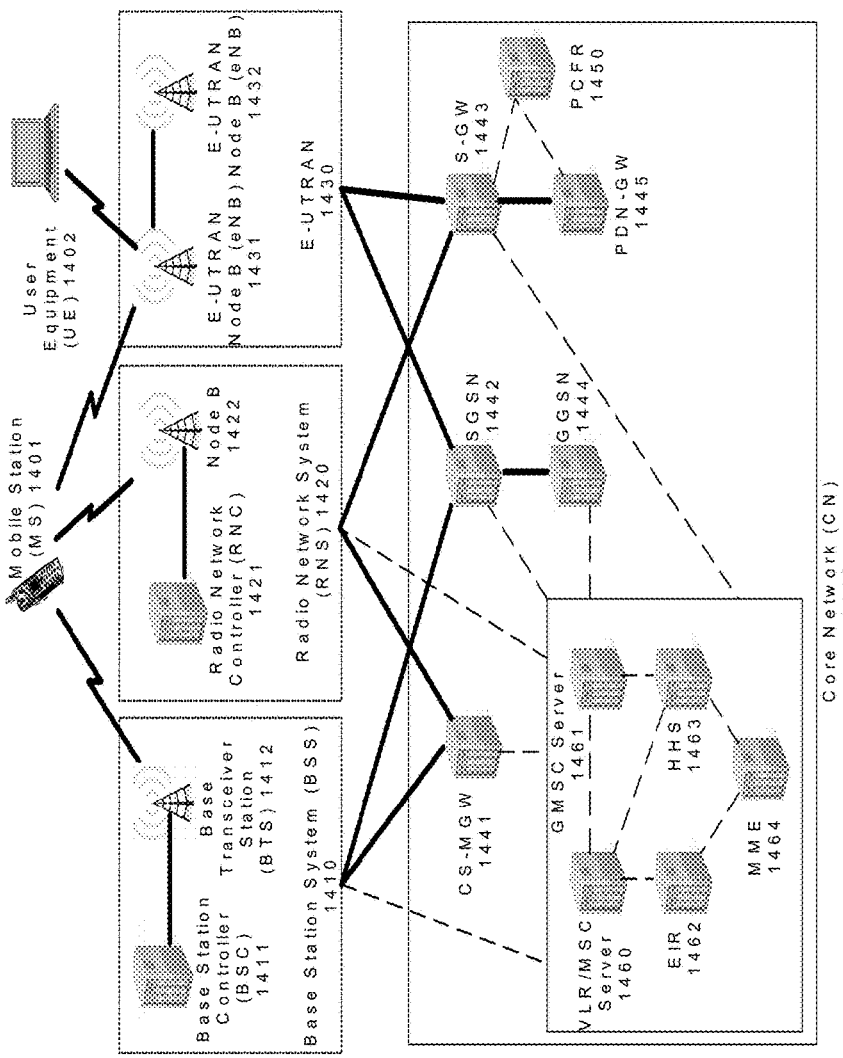
FIG. 17 illustrates a PLMN block diagram view of an example architecture that may be utilized to facilitate mobility management.

FIG. 17 illustrates a PLMN block diagram view of an example architecture that may be utilized to facilitate mobility management, as described herein. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 17 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

Mobility management, as described herein, may provide various technological advancements. For example, mobility management as described herein may provide a wireless management and control framework that enables common wireless management and control and handover of, for example, mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on UE types to reduce network cost and allow massive scale; shortening cycle time and improving network upgradability; flexibility in creating end-to-end services based on types of UEs and applications, thus improve customer experience; and improving UE power efficiency and battery life—especially for simple M2M devices—through enhanced wireless management.

Mobility management as described herein may provide a simple SDN-based packet routing and handover management mechanism that may enable mobile networks to scale control and increase sophistication independent of forwarding plane policy-driven packet routing across many wireless technologies, e.g. LTE, Wi-Fi, any future 5G access technologies Network-based, multiple, simultaneous connectivity within/across radio technologies to improve user peak/average throughput. Improved end user experience may be obtained by having intelligent packet routing based on UE type and application needs. Mobility management as described herein may provide an opportunity for an SDN routing engine to resolve potential conflicts and give operators some flexibility to customize network behaviors.

In an example configuration, mobility management may enable mobile networks to scale control and increase sophistication independent of forwarding plane policy-driven packet routing across many wireless technologies, e.g. LTE, Wi-Fi, any future 5G access technologies Network-based, multiple, simultaneous connectivity within/across radio technologies to improve user peak/average throughput Improve end user experience by having intelligent packet routing based on UE type and application needs. Provides an opportunity for the SDN routing engine to resolve potential conflicts and give operators some flexibility to customize network behaviors.

While example embodiments of mobility management have been described in connection with various computing devices/processors, the underlying concepts may be applied to any computing device, processor, or system capable of facilitating mobility management. The various techniques described herein may be implemented in connection with hardware or software or, where appropriate, with a combination of both. Thus, the methods and apparatuses of mobility management, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for mobility management, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with mobility management as described herein also may be effectuated via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing mobility management as described herein. When implemented on a general-purpose processor, the program code combines with the processor to provide a unique apparatus that operates to invoke the functionality of mobility management as described herein.

While mobility management has been described in connection with the various embodiments of the various figures, it is to be understood that other similar embodiments may be used or modifications and additions may be made to the described embodiments of mobility management without deviating therefrom. For example, one skilled in the art will recognize that mobility management as described in the instant application may apply to any environment, whether wired or wireless, and may be applied to any number of such devices connected via a communications network and interacting across the network. Therefore, mobility management as described herein should not be limited to any single embodiment, but rather should be construed in breadth and scope in accordance with the appended claims.

What is claimed:

1. An apparatus comprising:
a processor; and memory coupled to the processor, the memory comprising executable instructions that when executed by the processor cause the processor to effectuate operations comprising:
determining, by the apparatus, device conditions pertaining to a device,
wherein the apparatus is a software defined network controller that operates in a wireless network infrastructure in which control plane routing is decoupled from a data plane of the wireless network infrastructure;
determining network conditions pertaining to a first network entity with which the device is associated, wherein the device and the first network entity communicate via a first address associated with the device and the first network entity;
based on the device conditions and the first network entity conditions, determining a second network entity with which the device is to communicate;
determining a second address for communication between the device and the second network entity, wherein the second address is based on the device conditions and second network entity conditions, wherein the second network entity conditions comprise a cell type of the second network entity;
updating a table of the apparatus, the table comprising the device conditions and the second network entity conditions, wherein device conditions comprise an application executing on the device and a type of device; and
based on the table comprising the device conditions and the second network entity conditions, providing instructions to routers of a core network for routing packets from and to the device through the core network that connects with the first network entity and the second network entity.

2. The apparatus of claim 1, the device conditions comprising:
a location of the device.

3. The apparatus of claim 1, the cell type associated with the second network entity comprises a metro cell.

4. The apparatus of claim 1, the second network entity conditions comprising the cell type of the second network entity that comprises a macro cell.

5. The apparatus of claim 1, the first address comprising:
a prefix indicative of the first network entity; and
a suffix indicative of the device.

6. The apparatus of claim 1, the second address comprising:
a prefix indicative of the second network entity; and
a suffix indicative of the device.

7. The apparatus of claim 1, the operations further comprising:
providing an indication of a prefix for the second address, wherein an intended recipient of the indication of the prefix is the device.

8. The apparatus of claim 1, the device conditions comprising a mobility status of the device, the mobility status comprising one of mobile or stationary.

9. A method comprising:
determining, by a software defined network controller, device conditions pertaining to a device,
wherein the software defined network controller operates in a wireless network infrastructure in which control plane routing is decoupled from a data plane of the wireless network infrastructure;
determining network conditions pertaining to a first network entity with which the device is associated, wherein the device and the first network entity communicate via a first address associated with the device and the first network entity;
based on the device conditions and the first network entity conditions, determining a second network entity with which the device is to communicate;
determining a second address for communication between the device and the second network entity, wherein the second address is based on the device conditions and second network entity conditions, wherein the second network entity conditions comprise a cell type of the second network entity;
updating a table of the software defined network controller, the table comprising the device conditions and the second network entity conditions, wherein device conditions comprise an application executing on the device and a type of device; and
based on the table comprising the device conditions and the second network entity conditions, providing, by the software defined network controller, instructions to routers of a core network for routing packets from and to the device through the core network that connects with the first network entity and the second network entity.

10. The method of claim 9, the device conditions comprising:
a location of the device.

11. The method of claim 9, the first network entity conditions further comprising a load on the first network entity.

12. The method of claim 9, the second network entity conditions further comprising the cell type of the second network entity that comprises a femto cell type.

13. The method of claim 9, the first address comprising:
a prefix indicative of the first network entity; and
a suffix indicative of the device.

14. The method of claim 9, the second address comprising:
a prefix indicative of the second network entity; and
a suffix indicative of the device.

15. The method of claim 9, further comprising:
providing an indication of a prefix for the second address, wherein an intended recipient of the indication of the prefix is the device.

16. The method of claim 9, the device conditions comprising a mobility status of the device, the mobility status comprising one of mobile or stationary.

17. A computer-readable storage medium comprising executable instructions that when executed by a processor cause the processor to effectuate operations comprising:
determining, by a software defined network controller, device conditions pertaining to a device,
wherein the software defined network controller operates in a wireless network infrastructure in which control plane routing is decoupled from data plane of the wireless network infrastructure;
determining, by the software defined network controller, network conditions pertaining to a first network entity with which the device is associated, wherein the device and the first network entity communicate via a first address associated with the device and the first network entity;
based on the device conditions and a first network entity conditions, determining, by the software defined network controller, a second network entity with which the device is to communicate;
determining, by the software defined network controller, a second address for communication between the device and the second network entity, wherein the second address is based on the device conditions and second network entity conditions,
wherein the second network entity conditions comprise a cell type of the second network entity;
updating a table of the software defined network controller, the table comprising the device conditions and the second network entity conditions, wherein device conditions comprise an application executing on the device and a type of device; and
based on the table comprising the device conditions and the second network entity conditions, providing, by the software defined network controller, instructions to routers of a core network for routing packets from and to the device through the core network that connects with the first network entity and the second network entity.

18. The computer-readable storage medium of claim 17, wherein: the first address comprises: a prefix indicative of the first network entity; and a suffix indicative of the device; and the second address comprises: a prefix indicative of the second network entity; and a suffix indicative of the device.

* * * * *